(12) United States Patent
Chan et al.

(10) Patent No.: US 8,805,790 B1
(45) Date of Patent: Aug. 12, 2014

(54) BACKING UP AUDIO AND VIDEO FILES ACROSS MOBILE DEVICES OF A USER

(71) Applicant: Nextbit Systems Inc., San Francisco, CA (US)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

(73) Assignee: Nextbit Systems Inc., San Francisco, CA (US)

( * ) Notice: Subject to any disclaimer, the term of this patent is extended or adjusted under 35 U.S.C. 154(b) by 0 days.

(21) Appl. No.: 14/275,346

(22) Filed: May 12, 2014

Related U.S. Application Data

(63) Continuation-in-part of application No. 14/199,939, filed on Mar. 6, 2014.

(60) Provisional application No. 61/804,134, filed on Mar. 21, 2013.

(51) Int. Cl.
*G06F 7/00* (2006.01)
*G06F 11/14* (2006.01)
*G06F 17/30* (2006.01)

(52) U.S. Cl.
CPC ...... *G06F 11/1464* (2013.01); *G06F 17/30197* (2013.01); *G06F 17/30194* (2013.01)
USPC .......................................................... 707/652

(58) Field of Classification Search
CPC .............................................. G06F 17/30197
USPC .......................................................... 707/652
See application file for complete search history.

(56) References Cited

U.S. PATENT DOCUMENTS

2009/0276771 A1* 11/2009 Nickolov et al. ............. 717/177

OTHER PUBLICATIONS

U.S. Appl. No. 14/275,475 Chan, M.A., et al., filed May 12, 2014.

* cited by examiner

*Primary Examiner* — Etienne Leroux
*Assistant Examiner* — Ajith Jacob
(74) *Attorney, Agent, or Firm* — Perkins Coie LLP

(57) ABSTRACT

Technology is disclosed for selectively backing up audio files and video files of a user in a distributed backup system. In the distributed backup system, the user can define various policies for storing different data files of the user at different devices of the user and/or at a server. For example, the user may define a policy for storing video files on a device having a bigger display and audio files on a device which the user uses more often than the other devices. When a backup is initiated on a particular device, the technology identifies target devices based on the defined policies, and transmits the audio and video files from the particular device to the corresponding target devices. The audio and video files are transmitted via the server or directly if the target devices are in proximity to the particular device.

30 Claims, 12 Drawing Sheets

P1 = {Type: audio; Format: MP3; Device: D1}

P2 = {Type: Image; Category: Personal; Device: D3}

P3 = {Size < 10 MB; Device: D1}

P4 = {Type: audio; Format: AAC; Type: Document; Device: D3}

P5 = {Type: video and available storage space > 10 GB; Device: D2}

P6 = {name: "Hawaii Vacation.avi"; Device: D3}

P7 = {Type: emails; Access likelihood > 70%; Device D3}

...

Pn = { ... }

BACKING UP AUDIO AND VIDEO FILES ACROSS MOBILE DEVICES OF A USER

CROSS-REFERENCE TO RELATED APPLICATION(S)

This application is a continuation-in-part of U.S. patent application Ser. No. 14/199,939, entitled "UTILIZING USER DEVICES FOR BACKING UP AND RETRIEVING DATA IN A DISTRIBUTED BACKUP SYSTEM", filed on Mar. 6, 2014, which claims the benefit of U.S. Provisional Patent Application No. 61/804,134, entitled "OPERATING SYSTEM AND DEVICE INTEGRATED WITH CLOUD COMPUTING FUNCTIONALITIES", filed on Mar. 21, 2013, all of which are incorporated by reference herein in their entirety.

TECHNICAL FIELD

Several of the disclosed embodiments relate to data backup and retrieval techniques, and more particularly, to backing up and retrieving data in a distributed backup system.

BACKGROUND

Portable devices such as mobile phones, smartphones, and tablet computers have become more common among individuals. A large amount of data may be stored on these devices which may be needed to be backed up. Cloud computing technology may permit a user to back up their data on a remote server. While useful, remote type backups may not be reliable since the remote server can be a single point of failure. That is, if the remote server is down, the remote data may not be accessible by the user. Also, retrieving the files from the remote server can consume more time, e.g., if the network connecting the user and the remote server is congested, if the available network bandwidth is low, or if the remote server is busy serving other requests. If the connection between the remote server and the user device breaks, the user may have to back up the file again; this can be time consuming, especially if the file is a large file. Often, users may not backup their devices' data due to the extra effort and time involved. Further, privacy and security issues may arise with the sharing of data to and from third parties.

DETAILED DESCRIPTION

Figure 1:
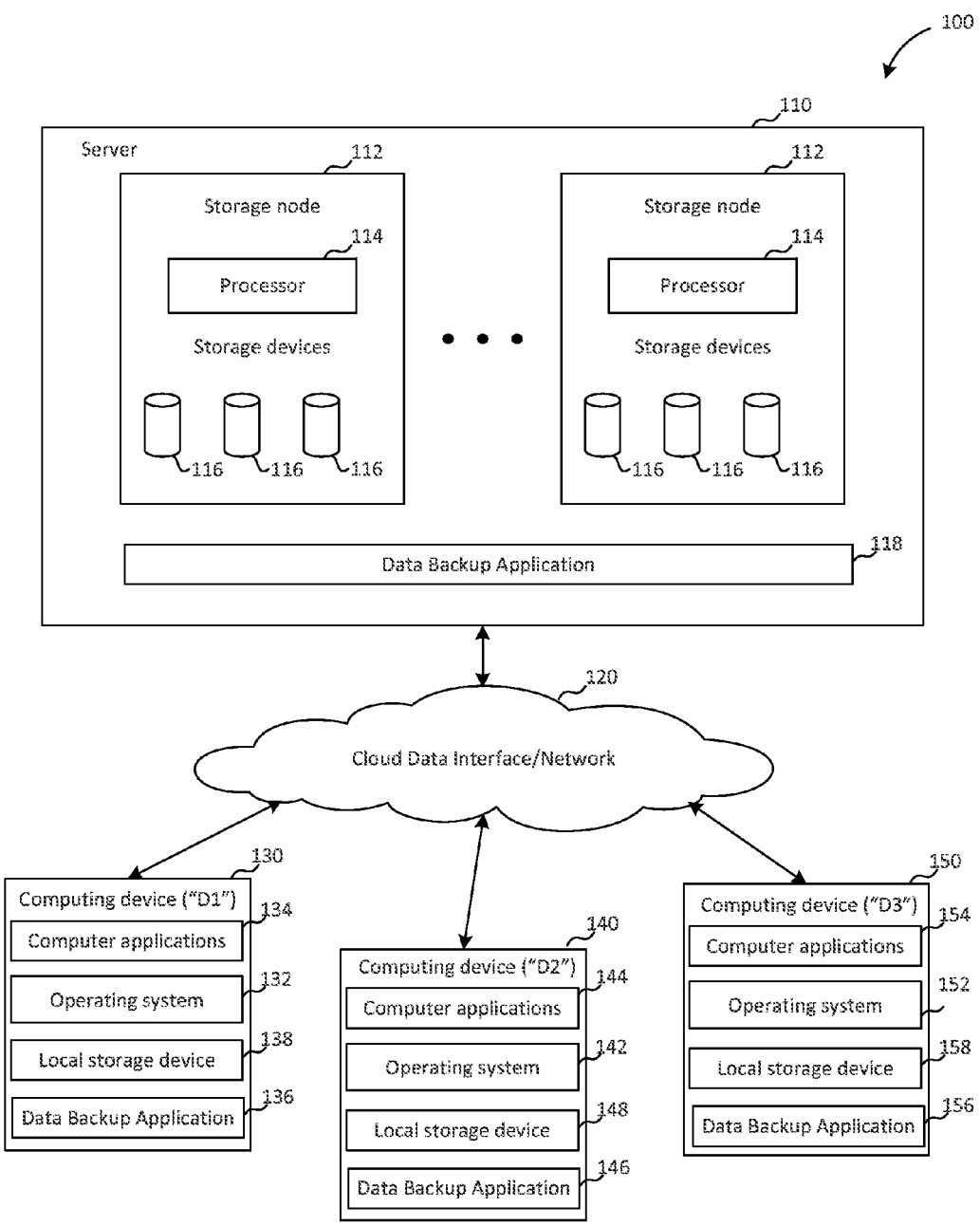
FIG. 1 is a block diagram illustrating an environment in which distributed backup of data files can be implemented.

Technology is disclosed for backing up and/or retrieving data in a distributed backup system ("the technology"). In some embodiments, data files of a user are stored across multiple computing devices of the user, e.g., mobile computing devices such as a tablet, a laptop, or a smartphone, and/or at a server, e.g., a cloud storage server, in the distributed backup system. The user can define data backup policies for storing different data files at different computing devices. For example, if the user has computing devices with different form factors, the user may define a data backup policy for storing video files on a computing device that has a bigger display. In some embodiments, a data backup application executing on the computing device and/or the server can generate data backup policies based on the type of the computing devices of the user. The user can further customize the presented data backup policies or add new data backup policies.

The technology facilitates fast retrieval of data files from the distributed backup system by minimizing the response time in accessing the data files. In some embodiments, the computing devices are used as an edge cache of the distributed backup system. In some embodiments, edge caching refers to the use of caching servers to store content closer to end users. When a user requests to access a particular data file in the distributed backup system, the distributed backup system determines whether any of the other computing devices of the user that is in proximity to the particular computing device from which the user is requesting has the particular data file. If another proximate computing device has the particular data file, the particular data file is transmitted to the user from the proximate computing device instead of from the server, thereby minimizing the response time in accessing the particular data file. The particular computing device can communicate with the proximate computing device using various direct communication techniques (also referred to as "short range wireless communication"). A direct communication technique can include Wi-Fi communication via a wireless access point and peer-to-peer (P2P) communication techniques, e.g., Bluetooth, Wi-Fi direct, AirDrop, Infrared, near field communication (NFC), or digital living network alliance (DLNA).

In some embodiments, the distributed backup system tracks the access pattern of the data files by the user, and updates the data backup policies accordingly. For example, if the distributed backup system determines that a particular data file is accessed frequently using a particular computing device and often there are other computing devices in the proximity when the user accesses the particular data file, the particular data file can be backed up to one of the proximate devices rather than the cloud storage server. The distributed backup system can optimize the backing up of data files by determining which data files are backed up to the cloud storage server and which data files are backed up to the computing devices based on the access pattern. The distributed backup system monitors user access of the data files to generate various access patterns that can be used to perform various such optimizations, e.g., in terms of response time, storage space utilization across computing devices, or high availability of data files.

Environment

FIG. 1 is a block diagram illustrating an environment in which distributed backup of data files can be implemented. The distributed backup system 100 includes a server 110, e.g., a cloud storage server, configured to handle communications between the computing devices 130-150. The server 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud data interface 120 can also be included to receive data from and send data to computing devices 130-150. The cloud data interface 120 can include network communication hardware and network connection logic to receive the information from computing devices. The network can be a local area network (LAN), wide area network (WAN) or the Internet. The cloud data interface 120 may include a queuing mechanism to organize data update received from or sent to the computing devices 130-150.

In some embodiments, any communication between the computing devices 130-150 is routed through the server 110. For example, data related to computer applications 134-154 or data files to be backed up in the distributed backup system 100, can be exchanged between the computing devices 130-150 through server 110. In some embodiments, where the computing devices 130-150 can communicate with each other directly using a P2P communication technique, e.g. Bluetooth, the server 110 facilitates the computing devices 130-150 to communicate directly for exchanging the data. In some embodiments, the computing devices 130-150 can communicate directly with each other without any coordination by the server 110. In some embodiments, while the computing devices 130-150 send/receive the data directly, the server 110 may also obtain a copy of the data.

Although FIG. 1 illustrates three computing devices 130, 140 and 150, a person having ordinary skill in the art will readily understand that the technology disclosed herein can be applied to a single computing device or more than two computing devices connected to the server 110.

The computing devices 130-150 include an operating system 132-152 to manage the hardware resources of the computing devices 130-150 and provide services for running computer applications 134-154 (e.g., mobile applications running on mobile devices). The operating system 132-152 facilitates execution of the computer applications 134-154 on the computing device 130-150. The computing devices 130-150 include at least one local storage device 138-158 to store the computer applications 134-154 and user data. The computing device 130-150 can be a desktop computer, a laptop computer, a tablet computer, an automobile computer, a game console, a smartphone, a personal digital assistant, or other computing devices capable of running computer applications, as contemplated by a person having ordinary skill in the art. Some examples of the operating system 132-152 include Android, iOS, Windows, etc.

The computer applications 134-154 stored in the computing devices 130-150 can include applications for general productivity and information retrieval, including email, calendar, contacts, stock market and weather information. The computer applications 134-154 can also include applications in other categories, such as mobile games, factory automation, GPS and location-based services, banking, order-tracking, ticket purchases or any other categories as contemplated by a person having ordinary skill in the art.

All or some of the network connections of the computing devices 130-150 are through the server 110. The network connections can include Transmission Control Protocol (TCP) connections, User Datagram Protocol (UDP) connections, or other types of network connections based on other protocols. When there are multiple computer applications 134-154 that need network connections to multiple remote servers, the computing devices 130-150 only needs to maintain one network connections with the server 110. The server 110 will in turn maintain multiple connections with the remote servers on behalf of the computer applications 134-154.

A user, e.g., a user associated with the computing devices 130-150, can backup data files of the user across multiple computing devices. Alternatively or in addition to backing up across the computing devices, the user can back up the data files to the server 110. That is, the distributed backup system 100 facilitates backing up of the user's data files from the computing devices 130-150 to the server 110 or from the server 110 to the computing devices 130-150. The data files are backed up across the computing devices 130-150 based on various data backup policies. The data backup policies are designed to optimize the distributed backup system 100 in various aspects, including to minimize the response time in accessing the data files, improving storage space utilization across the computing devices, or storing particular data files in a particular computing device based on the user preference, e.g., to provide convenience. The data backup policies are described in greater detail in the following paragraphs.

When the user requests, using a particular computing device, e.g., computing device 130, to access a particular data file in the distributed backup system 100, the distributed backup system 100 determines whether any of the other computing devices of the user, e.g., computing devices 140 or 150, that is in proximity to the particular computing device. If another proximate computing device has the particular data file, the particular data file is transmitted to the user from the proximate computing device instead of from the server, thereby minimizing the response time in accessing the particular data file. In some embodiments, the data backup and retrieval are facilitated by data backup applications 136-156 at the computing devices 130-150 and/or by data backup application 118 at the server 110. In some embodiments, the data backup applications 136-156 can be part of the operating system 132-152 executing on the computing devices 130-150, respectively. Additional details with respect to the data backup and retrieval in the distributed back up system are described at least with reference to FIGS. 2-11.

Figure 2:
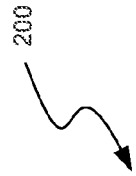
FIG. 2 illustrates an example of data backup policies employed for backing up of data in a distributed backup system.

FIG. 2 illustrates an example of data backup policies 200 employed for backing up of data in a distributed backup system such as the distributed backup system 100 of FIG. 1. A data backup policy defines the criterion for storing a data file in a computing device. In some embodiments, the criterion is based on attributes of the data file, e.g., a type, size, created date, modified date, a format, or a category. The type of the data file can include at least one of an image, an audio, a video, a document, an email, etc. The format of the data file can include at least one of Joint Photographic Experts Group (JPEG), a bitmap, a Microsoft Word document, a Portable Document Format (PDF), MP3, Advanced Audio Coding (AAC), etc. The category can be a category to which the data file belongs, e.g., user defined categories such as entertainment, business, or personal.

In some embodiments, the criterion is based on attributes of a computing device, e.g., processing capacity, a total available space, size of a display, resolution of the display, battery capacity, or an operating system and/or applications executing on the computing device. In some embodiments, the data backup application automatically obtains the device information of the computing device it is executing on, e.g., by using an application programming interface (API) provided by the operating system on the computing device. In some embodiments, the data backup application can have the user provide the device information. The data backup application can store the device information as part of backup metadata on the computing device.

In some embodiments, the criterion is based on a likelihood of a particular data file being accessed on a particular computing device or a likelihood of one or more computing devices being in proximity to the particular computing device when the particular data file is accessed is on the particular computing device. If a user is more likely to access the particular data file on a particular computing device, the particular data file can be backed up to the particular computing device instead of the server 110 so that the user can retrieve the particular data file faster. Alternatively (or in addition to), the particular data file can also be backed up to the other computing devices in the proximity, e.g., if the particular computing does not have sufficient storage space to store the particular data file, instead of the server 110. In some embodiments, the data backup application monitors the access of the data files by the user and generates an access pattern based on various parameters. The access pattern can be used to determine the likelihood and define the data backup policies using the likelihood.

Some example policies are illustrated using data backup policies 200. The data backup policies 200 serve various purposes. For example, the user may define a data backup policy, e.g., "P5," for storing video files on a computing device that has a bigger display, e.g., computing device 140. This data backup policy can be useful in a scenario where the computing devices have a display with different form factors, and the user can choose to store the video data files on the device with bigger display. The data backup policy "P5" also includes a storage space criterion which indicates that the data files are to be backed up to the computing device 140 if the available storage space at the computing device 140 is greater than "10 GB." If the available storage is lesser than "10 GB," the data files are not backed up to the computing device 140. In some embodiments, the user may define an alternative computing device in the policy "P5" to which the data files can be backed up to if the available storage space in the computing device 140 is lesser than "10 GB." This way, the storage space within the computing devices of the user can be utilized more optimally. In some embodiments, the user may define a policy to store all the video files of the user in a particular computing device.

In another example, the user may define a data backup policy, e.g., "P1," for storing audio files on a computing device that the user uses more often than the other computing devices, e.g., computing device 130. Note that data backup policies 200 contain two policies—"P1" and "P4" for storing audio files in different computing devices. However, in some embodiments, the user may define a single policy to store all audio files in one of the computing devices 130-150. In yet another example, the user may define a data backup policy, e.g., "P6" for storing a particular file, e.g., a vacation trip video, on a computing device which the user uses to store personal data files, e.g., computing device 150. In yet another example, the user may define a data backup policy, e.g., "P2," for storing data files of a particular category, e.g., image files that are categorized as personal, on a computing device which the user uses to store personal data files, e.g., computing device 150.

In another example, the user may define a data backup policy, e.g., "P7," for storing particular data files, e.g., emails, on a computing device if the likelihood of accessing those data files on a computing device, e.g., computing device 150, exceeds a certain value. In some embodiments, the data backup application 156 continuously monitors the number of times the emails are accessed on the computing device 150 and determines the likelihood of the emails being accessed in the future based on the monitored data. If the likelihood exceeds the defined value, the data backup mobile application 156 backs up the emails to the computing device 150. In some embodiments, the determination of likelihood can be done at a predefined schedule, e.g., when a data backup job is scheduled to execute.

In some embodiments, if a particular data file does not match with any of the defined data backup policies, the particular data file may be backed up to the server 110. In some embodiments, all the data files of the user are backed up to the server 110 by default.

The user can generate various such data backup policies in the distributed backup system 100, e.g., using the data backup applications. However, the data backup applications (of a computing device or the server 110) can create new data backup policies or modify the data backup policies 200, e.g., based on an access pattern of the data files, to further optimize the data backup and retrieval in the distributed backup system 100.

The user may create a data backup policy on any of the computing devices 130-150. The data backup applications 136-156 on the computing devices 130-150 can synchronize with each other to share the data backup policies created at all the computing devices 130-150. Alternatively, each of the computing devices 13-150 can send the data backup policies to the server 110, and the server 110 can consolidate the data backup policies created at all the computing devices 130-150 and send it to each of the computing devices 130-150. The same is done for backup metadata which includes data such as device information, a mapping of data files to computing devices, etc. Each of the computing devices 130-150 can have a copy of the backup metadata. The server 110 can also store a copy of the data backup policies and the backup metadata.

Note that the representation of data backup policies 200 in FIG. 2 is an example representation. The data backup policies 200 may be represented in various other ways. For example, all policies for a particular computing device can be combined and represented as a single data backup policy for the particular computing device. In another example, the data backup policy parameters which are represented as key value pairs, e.g., "type:audio," can be represented as just values and the data backup application can identify what attribute each of the values correspond to. The user can generate the data backup policies using a graphical user interface (GUI) provided by the data backup application.

Figure 3:
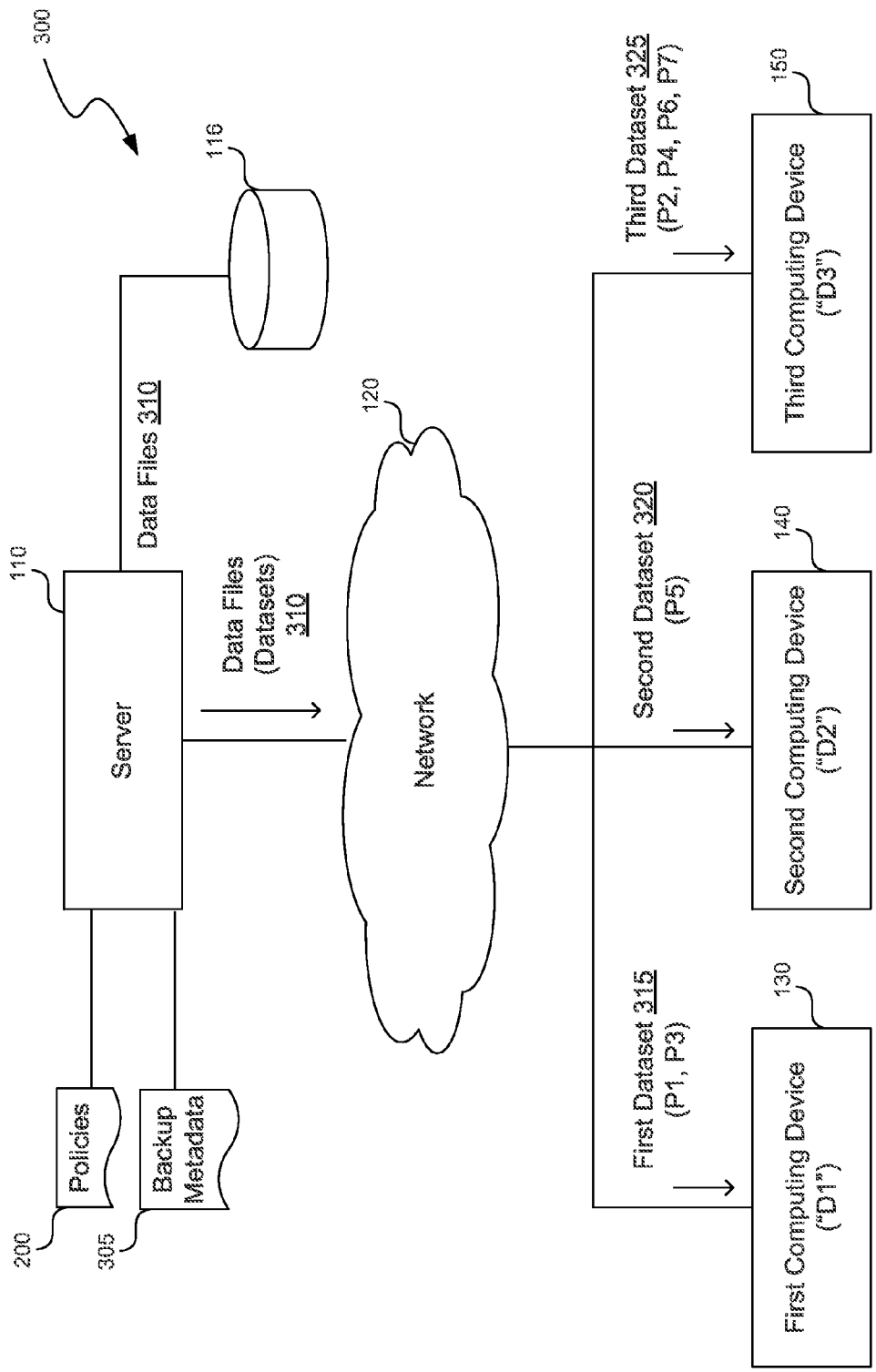
FIG. 3 illustrates a block diagram for backing up data files from a server to multiple computing devices of the user in a distributed backup system.

FIG. 3 illustrates a block diagram 300 for backing up data files from a server to multiple computing devices of the user in a distributed backup system. The server 110 facilitates backing up of data files 310 stored at one or more storage devices 116 to one or more of the computing devices 130-150 associated with the user based on the data backup policies 200. The user can request the server 110 to back up the data files 310 or the server 110 can initiate the backup based on an occurrence of an event, e.g., addition of a new computing device, or beginning of a next backup interval. The server 110 obtains the data files 310 from the storage device 116 and identifies for each of the data files one or more computing devices the data file has to be backed up to, based on the data backup policies 200. The server 110 generates a subset of the data files 310 for each of the one or more computing devices 130-150, e.g., first dataset 315, second dataset 320, and third dataset 325, and transmits the datasets 315-325 to the corresponding computing devices 130-150.

The server 110 identifies the computing device the data file has to be backed up to by identifying one or more data backup policies with which the data file matches. For example, the server 110 can compare the data file attributes, e.g., type, format, or size, with each of the data backup policies 200 to determine whether the data file matches with a data backup policy. If the data file matches with a data backup policy, the server 110 obtains any device specific attributes of the computing device associated with the data backup policy, e.g., storage space availability, and verifies if the corresponding computing device satisfies the data backup policy. If the computing device satisfies the data backup policy, the computing device is identified as the computing device to which the data file is to be backed up to.

The server 110 identifies the computing devices for all the data files 310 and transmits them to the corresponding computing devices. In some embodiments, the server combines the data files to be backed up to a particular computing device into a dataset and then transmits the dataset to the particular computing device. For example, the first dataset 315 transmitted to the computing device 130 can include the data files that match with at least one of the policies "P1" or "P3" associated with the computing device 130. Similarly, the second dataset 320 transmitted to the computing device 140 can include the data files that match with the policy "P5" associated with the computing device 140. Similarly, the third dataset 325 transmitted to the computing device 150 includes the data files that match with at least one of the policies "P2," "P4," "P6," or "P7" associated with the computing device 150. In some embodiments, a particular computing device may not receive any data file for storing, e.g., if none of the data files 310 match one or more policies associated with the particular computing device.

In some embodiments, upon successful completion of the backup, the server 110 updates a mapping of the data files to the computing devices in the backup metadata 305. The mapping includes, for each of the data files, identifications (IDs) of the computing devices to which the data file is backed up. The mapping enables the server 110 to keep track of where the data files are stored in the distributed backup system 100. The backup metadata 305 can also include other information such as a last backup time, a last backup size for each of the computing devices and/or total backup size, a device which initiated the backup, etc. The server 110 can also store a copy of the backup metadata 305 on each of the computing devices 130-150. In some embodiments, the server 110 performs the above discussed back up processing using the data backup application 118. The data backup application 118 further coordinates with the data backup applications 136-156 on the computing devices 130-150 to store the data files 310 at the computing devices 130-150.

Figure 4:
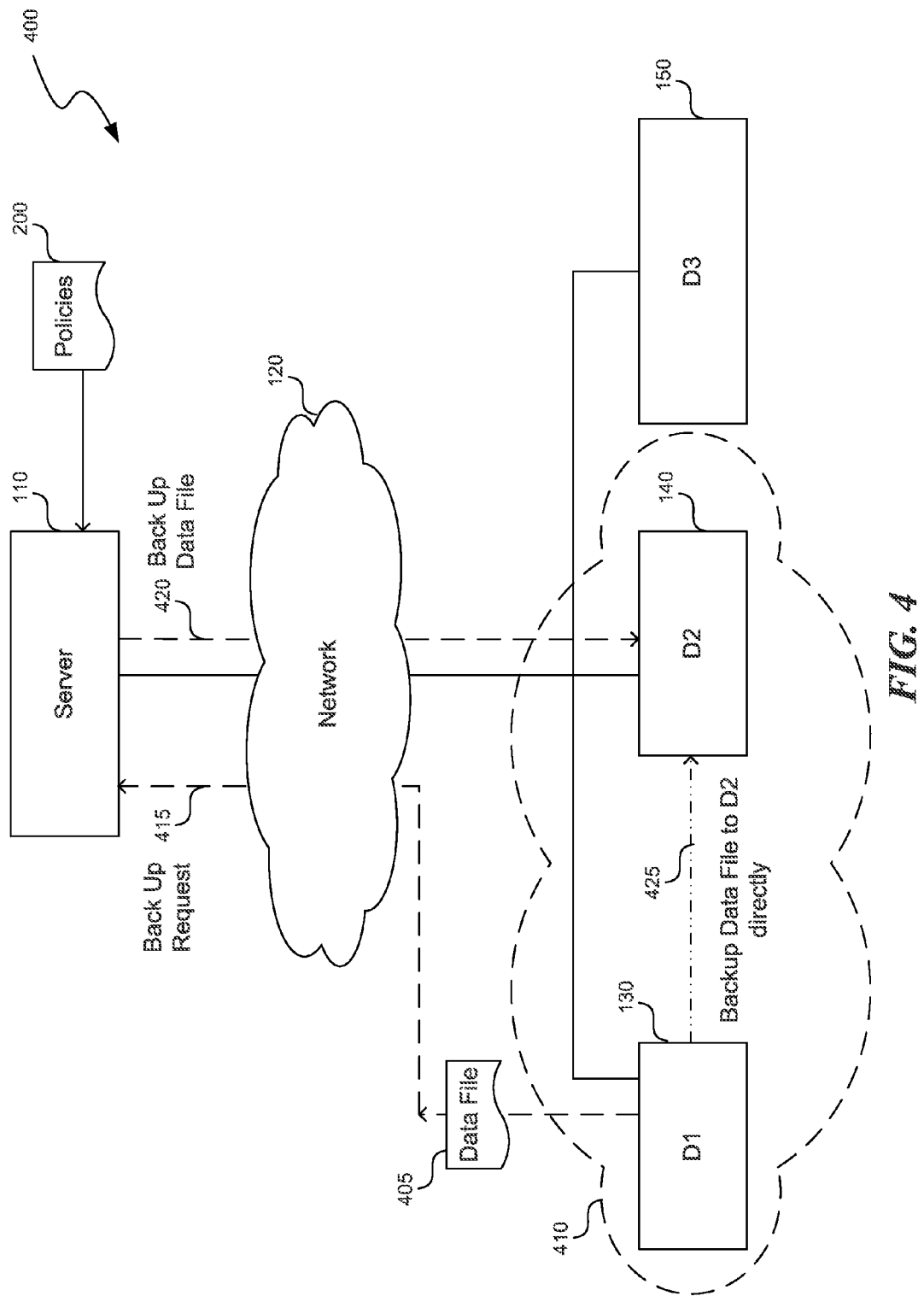
FIG. 4 illustrates a block diagram for backing up a data file from a computing device to the distributed backup system.

In some embodiments, the user may backup data files from a computing device. FIG. 4 illustrates a block diagram 400 for backing up a data file from a computing device to the distributed backup system. The user requests 415 to back up a data file 405 from the computing device 130 to the distributed backup system 100. The data file 405 can be a data file that is generated or received at the computing device 130 from a source other than the server 110 or other computing devices 140-150. The data file 405 can be backed up to the server 110 or any of the other computing devices 140-150 based on the data backup policies 200.

In some embodiments, the data backup application 136 on the computing device 130 sends the data file 405 as part of a backup request 415 to the server 110. The server 110 determines the computing device to which the data file 405 is to be backed up based on the data backup policies 200. For example, the server 110 can determine that the data file 405 is to be backed up to the computing device 140. The server 110 then backs up 420 the data file 405 to the computing device 140. In some embodiments, the server 110 may not backup the data file 405 to any computing device, e.g., if no computing device is identified for the data file 405 or if the data backup policy for the data file 405 indicates that the data file 405 is to be stored at the server 110 only.

In some embodiments, the computing device 130 can back up 425 the data file 405 to the computing device 140 directly instead of backing up via the server 110. For example, if the computing device 140 is in proximity 410 to the computing device 130, the computing device 130 can send the data file 405 to computing device directly, e.g., using direct communication techniques, which can include Wi-Fi communication via a wireless access point and P2P communication such as (a) Bluetooth, (b) Wi-Fi direct, (c) NFC, (d) AirDrop, (e) Infrared, or (f) DLNA. Recall from FIG. 2 that the each of the computing devices 130-150 have a copy of the data backup policies 200. The data backup application 138 at the computing device 130 can determine that the data file 405 has to be backed up to computing device 140 based on the data backup policies 200. The computing device 130 can then send 425 the data file 405 to computing device 140 directly if the computing device 140 is in proximity 410 to the computing device 130.

The data backup application 136 determines that the computing devices 130 and 140 are in proximity 410 to one another if the computing device 130 and the computing device 140 satisfy proximity based criterion.

In some embodiments, the proximity based criterion can include determining whether the computing devices 130 and 140 can communicate directly, for example, using direct communication techniques. If the computing devices 130 and 140 can communicate directly, they are considered to satisfy the proximity based criterion.

In some embodiments, the proximity based criterion can include determining whether the computing devices 130 and 140 share a common communication network, e.g. a wireless network such as a home Wi-Fi network. If the computing devices 130 and 140 share a common communication network, they are considered to satisfy the proximity based criterion.

In some embodiments, the proximity based criterion can include geographical location proximity of the computing devices 130 and 140, e.g., a distance between the two computing devices or a function of the distance. Various other functions may be used in determining the geographical location proximity. The geographical location of the device can be determined using various means, such as Global Positioning System (GPS), installed on the computing device 130, cellular towers the computing device is in communication with, IP address, through an application installed on the computing device that has location details of the computing device etc. If the computing devices 130 and 140 are within a predefined distance, they are considered to satisfy the proximity based criterion.

If the computing devices 130-140 are in proximity 410, the computing device 130 can back up the data file 405 to computing device 140 directly. Additionally, the computing device 130 may also backup another copy of the data file 405 to the server 110. After the successful completion of the data backup, the backup metadata is updated by, e.g., either the data backup application 118 or the data backup application 136, and is synchronized with all the remaining computing devices in the distributed backup system 100.

The user can initiate the backup by executing a data backup job using any of the data backup applications 136-156 on the computing devices 130-150. In some embodiments, the user may configure the data backup job to execute at an occurrence of an event, e.g., predefined intervals, when a data file on a computing device changes, when the user adds a new computing device to the distributed backup system 100, or when the user removes an existing computing device from the distributed backup system 100 (e.g., user is no longer using the computing device or does not want to backup data to the computing device).

Figure 5:
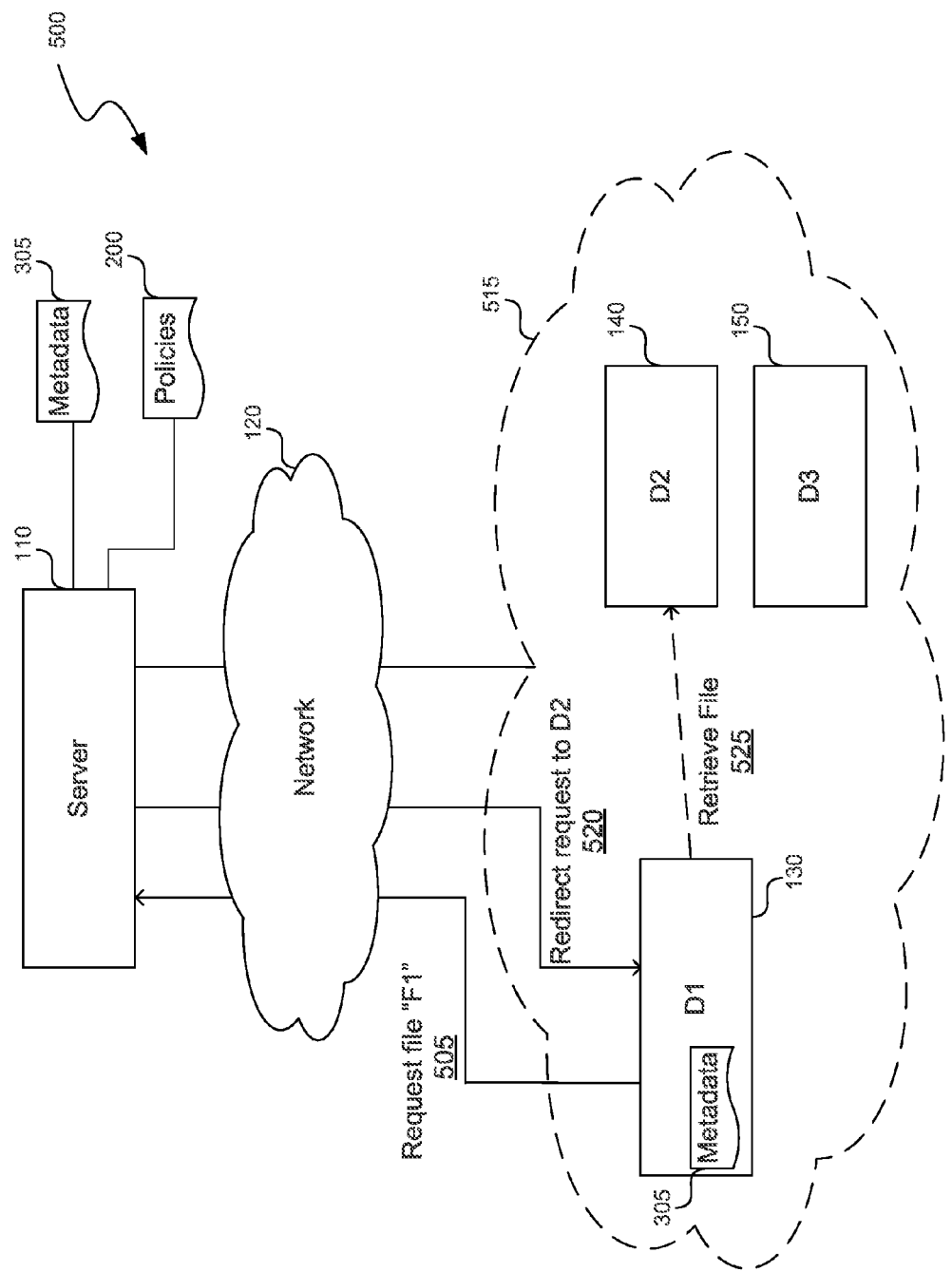
FIG. 5 is a block diagram for retrieving data files from a distributed backup system.

FIG. 5 is a block diagram 500 for retrieving data files from a distributed backup system. A user issues a request 505 using from the computing device 130 for retrieving a data file from the server 110. If the server 110 has a copy of the data file, the server 110 returns the data file to the computing device 130. If the server 110 does not have the data file, the server 110 determines a location of the data file, e.g., the computing devices 140-150. In some embodiments, the server 110 refers to the mapping of the data files to computing devices in the backup metadata 305 to obtain the location of the data file. In some embodiments, the server 110 refers to the data backup policies 200 to determine which of the computing devices the data file has been backed up to. For example, the server 110 determines that the data file is backed up to the computing device 140. In some embodiments, the server 110 obtains the data file from the computing device 140 and transmits it to the computing device 130.

However, if the server 110 determines that the computing device 140 is in proximity 515 to the computing device 130, the server 110 indicates the computing device 130 to redirect 520 the request to the computing device 140. The computing device 130 communicates with the computing device 140 and retrieves the data file directly. The computing device 130 retrieves the data file directly from the computing device 140 using direct communication techniques described above with reference to FIG. 4. The server 110 can determine whether the computing device 140 is in proximity 515 to the computing device 130 as described above with reference to proximity 410 in FIG. 4.

In some embodiments, the computing device 130 can retrieve the data file directly from the computing device 140 without requesting 505 the server 110. Recall from FIG. 2 that the each of the computing devices 130-150 have a copy of the data backup policies 200 and backup metadata 305. The data backup application 136 determines using the backup metadata 305 and/or the data backup policies 200 that the computing device 140 has the data file. Further, the data backup application 136 also determines that the computing device 140 is in proximity 515 to the computing device 130. After the determination, the data backup application 136 communicates with the data backup application 146 of the computing device 140 directly, e.g., using direct communication techniques, and obtains the data file.

The computing devices 130-150 can act as edge cache servers of the distributed backup system 100. In some embodiments, edge caching refers to the use of caching servers to store content closer to end users. By having a computing device access the data file from a proximate computing device instead of from the server 110, the response time in accessing the data file is minimized, that is, any latency involved in retrieving the data file is minimized. Accordingly, the user experience is also enhanced.

In some embodiments, the distributed backup system 100 tracks the access pattern of the data files by the user, and updates the data backup policies 200 accordingly. In some embodiments, each of the data backup applications 136-156 on the computing devices 130-150 can monitor the access of the data files on the respective computing devices and transmit the access pattern to the server 110. The server 110 can use the access patterns to create new data backup policies or update the data backup policies 200 in various ways for further optimizing the data backup and retrieval in the distributed backup system 100, e.g., in terms of response time, storage space utilization across computing devices, or high availability of data files.

For example, if the server 110 determines that a particular data file is accessed frequently using a particular computing device and often there are other computing devices in the proximity when the user accesses the particular data file, the particular data file can be backed up to one of the proximate devices rather than the server. The server 110 can also determine which data files are to be backed up to the server 110 and which data files are to be backed up to the computing devices based on the access pattern. For example, if the server 110 determines that the frequency of access of a particular data file backed up on a computing device is below a threshold, the server 110 can modify the data backup policies 200 to back up the particular data file to the server 100 instead of the computing device. That way, storage space can be made available on the computing device for storing a data file whose frequency of access is above the threshold.

The access pattern can include data regarding (a) a particular computing device used by the user to access a particular data file, (b) a frequency of access of the particular data file from the particular computing device, (c) a set of computing devices that are in proximity to the particular computing device when the particular data file is accessed, (d) a period for which the particular computing device is used by the user to access the particular data file (e) a frequency of access of the particular data file, (f) a number of times the particular data file is obtained from the server, (g) a number of times the particular data file is obtained from any of the computing devices, etc.

Figure 6:
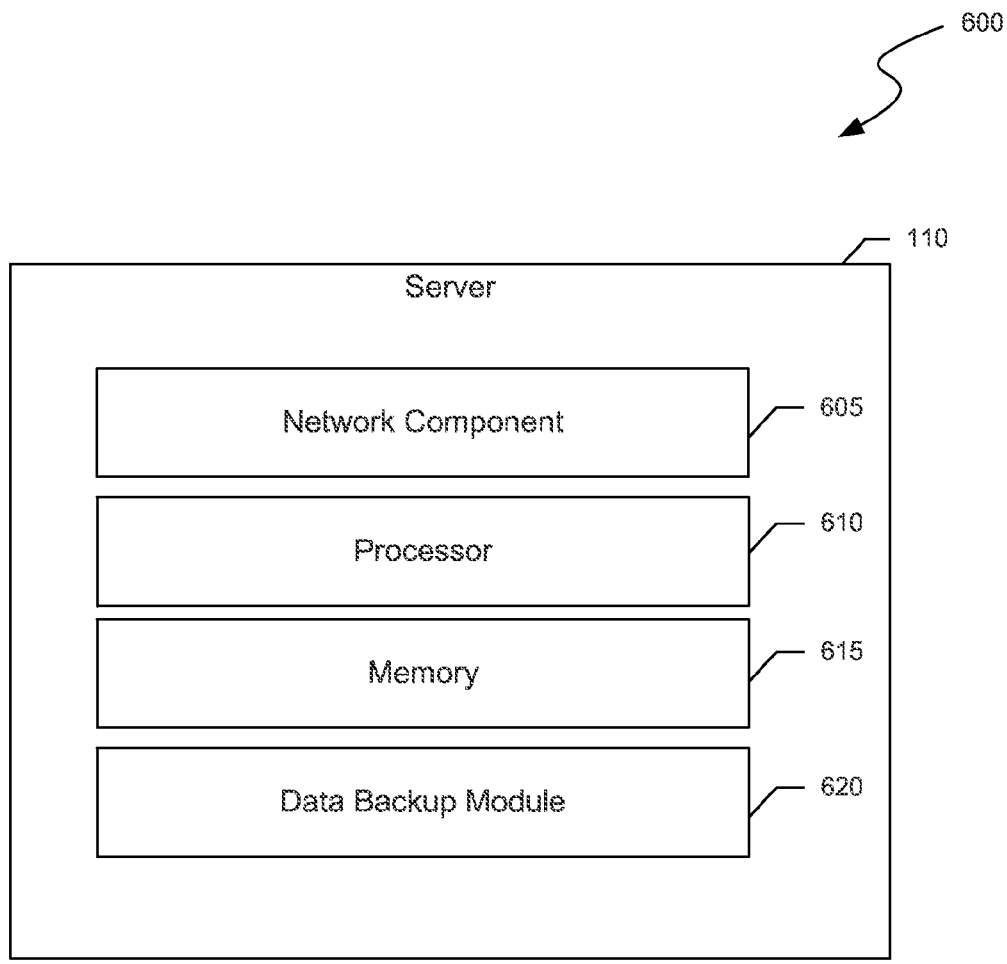
FIG. 6 is a block diagram of the server in a distributed backup system.

FIG. 6 is a block diagram 600 of the server 110 in a distributed backup system. The server 110 can be, e.g., a dedicated standalone server, or implemented in a cloud computing service having a plurality of servers. The server 110 includes a network component 605, a processor 610, a memory 615, and a data backup module 620. The memory 615 can include instructions which when executed by the processor 610 enables the server 110 to perform the functions, including data backup and retrieval, as described with reference to FIGS. 1-5. The network component 605 is configured for network communications with the computing devices 130-150, e.g., receiving data files for backup, sending data files upon access requests, or receiving requests for backup or access. The data backup module 620 implements the data backup application 118 for facilitating the server to perform the functions, including data backup and retrieval, as described with reference to FIGS. 1-5. Additional details with respect to the data backup module 620 are described with reference to FIG. 8 below.

Figure 7:
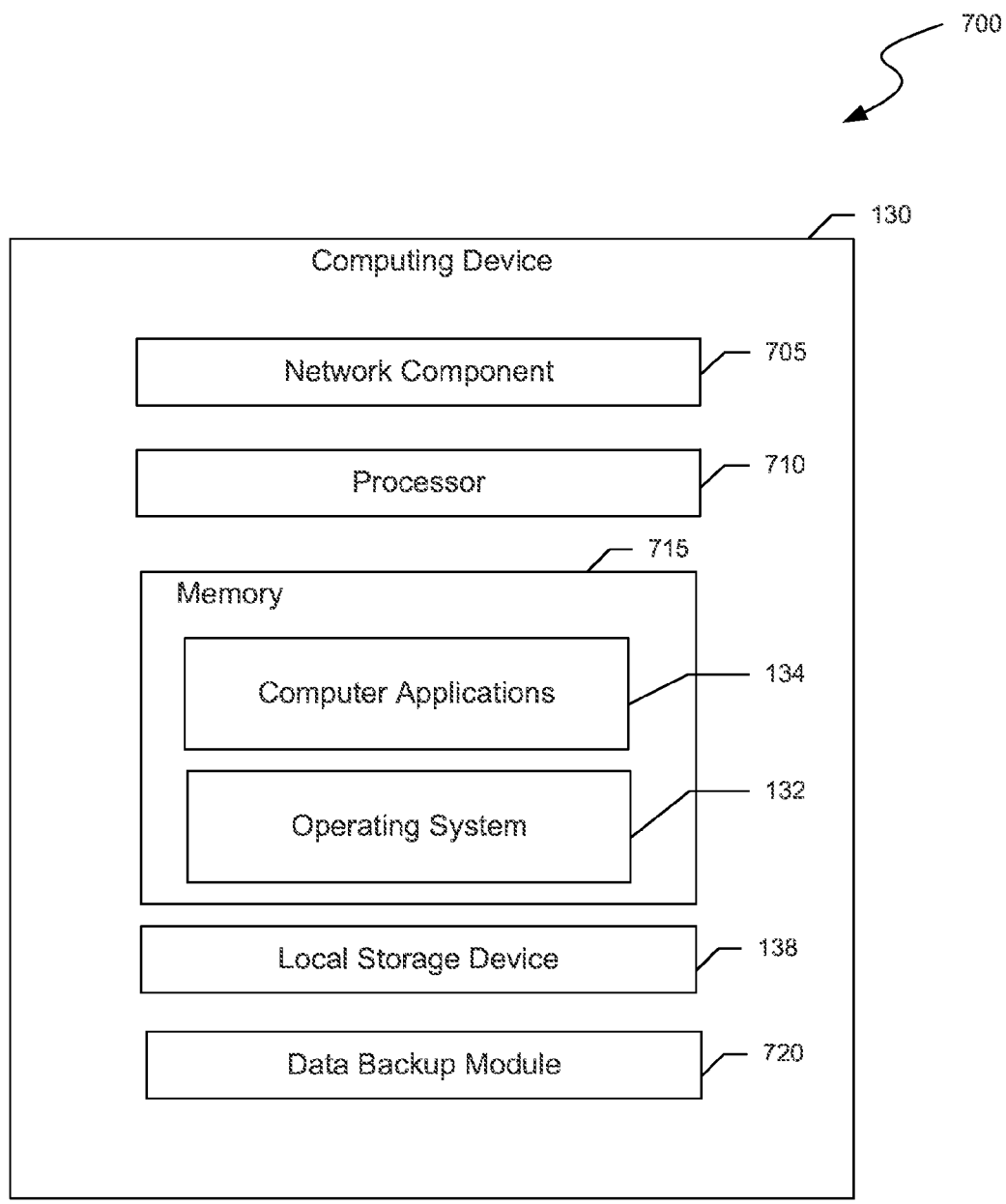
FIG. 7 illustrates a block diagram of a computing device in a distributed backup system.

FIG. 7 illustrates a block diagram 700 of a computing device 130. The computing device 130 can include a network component 705, a processor 710, a memory 715, the local storage device 138, and a data backup module 720. The memory 715 can store instructions of the operating system 132 of the computing device 130. The memory 715 can further store instructions of the computer applications 134 designed to run at the computing device 130.

The network component 705 can be capable of switching between states including a high power consumption state and a low power conservation state. The network component 705 can be, e.g. a Wi-Fi networking adapter, a cellular phone networking adapter, or a combination thereof. The processor 710 is configured to execute the computer applications 134 and the operating system 132 of the computing device 130. The memory 715 stores instructions of the operating system 132 which, when executed by the processor 710, cause the operating system 132 to perform processes for realizing certain functionalities of the computing device 130. For instance, the process of the operating system 132 can facilitate the data backup application 136 to backup and/or retrieve data from or to other computing devices 140-150.

The local storage device 138, as described above, can store the instructions, the operating system 132, user data such as profile data of the user, data files of the user and any other data necessary for the operation of the computing device 130 and execution of the computer applications 134.

The computing device 130 also includes a data backup module 720 that is used to implement the data backup application 136. The data backup module 720 performs various data backup and retrieval functions as described with reference to FIGS. 1-5. Additional details with respect to the data backup module 720 are described with reference to FIG. 8 below.

Figure 8:
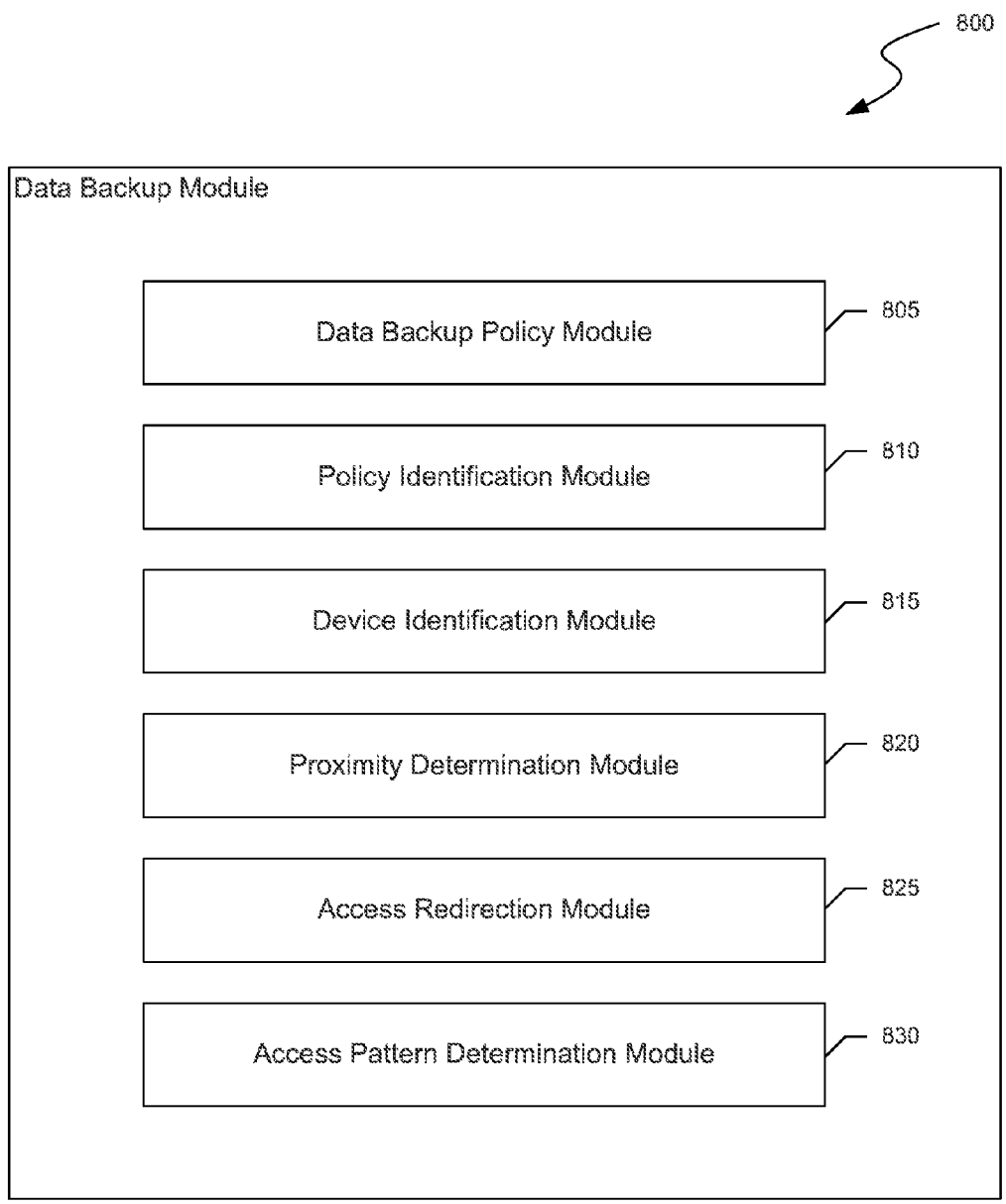
FIG. 8 illustrates a block diagram of a data backup module that can be implemented in a computing device and a server of a distributed backup system.

FIG. 8 illustrates a block diagram of a data backup module 800. In some embodiments, the data backup module 800 is similar to the data backup module 620 of FIG. 6 and the data backup module 720 of FIG. 7. In some embodiments, the data backup module 800 can be used to implement data backup applications such as the data backup applications 118 and 136-156 which are used for backing data files of a user in a distributed backup system.

The data backup module 800 includes a data backup policy module 805 to generate data backup policies, e.g., data backup policies 200 that are used for determining the computing devices to which the data files of the user are to be backed up to. A data backup policy defines the criterion for storing a data file in a computing device. In some embodiments, the criterion is based on attributes of the data file, e.g., a type, size, created date, modified date, a format, or a category. In some embodiments, the criterion is based on attributes of a computing device, e.g., processing capacity, a total available space, size of a display, resolution of the display, battery capacity, or an operating system and/or applications executing on the computing device. In some embodiments, the criterion is based on a likelihood of a particular data file being accessed on a particular computing device or a likelihood of one or more computing devices being in proximity to the particular computing device when the particular data file is accessed is on the particular computing device.

The data backup module 800 includes a policy identification module 810 to determine the data files that match a particular data backup policy. For example, the policy identification module 810 can compare the data file attributes, e.g., type, format, or size, with each of the data backup policies 200 to determine whether the data file matches with a particular data backup policy. If data file matches with the particular data backup policy, the policy identification module 810 also identifies the computing device associated with the particular data backup policy as the computing device to which the data file is to be backed up.

The data backup module 800 includes a device identification module 815 to identify a computing device which contains a particular data file. When a user requests to retrieve a particular data file, the device identification module 815 determines the location of the particular data file in the distributed backup system 100. In some embodiments, the device identification module 815 refers to a mapping stored in backup metadata, e.g., backup metadata 305, to obtain the location of the particular data file. The mapping includes, for each of the data files, identifications (IDs) of the computing devices to which the data file is backed up. In some embodiments, the device identification module 815 requests the policy identification module 810 to identify the computing devices containing the particular data file by identifying the data backup policy with which the particular data file matches.

The data backup module 800 includes a proxy determination module 820 to determine if two computing devices are in proximity to each other. The proxy determination module 820 determines that two computing devices are in proximity to one another if the two computing devices satisfy a proximity based criterion. In some embodiments, the two computing devices satisfy a proximity based criterion if the computing devices share a common communication network, e.g. a wireless network such as a home Wi-Fi network. In some embodiments, the two computing devices satisfy a proximity based criterion if geographical location proximity of the computing devices, e.g., a distance between the two computing devices or a function of the distance, is within a threshold. In some embodiments, the two computing devices satisfy a proximity based criterion if the computing devices can communicate directly, e.g., using direct communication techniques.

The proximity between two computing devices is determined for various reasons, including for facilitating the computing devices to communicate with each other directly instead of via the server 110. In some embodiments, a computing device can retrieve a data file directly from another computing device that is in proximity to the computing device, instead of from the server 110, thereby minimizing any delay that can be caused in retrieving the data file from the server 110 over the network 120.

The data backup module 800 includes an access redirection module 825 to redirect a request issued by a computing device to a server for retrieving a data file, to another computing device that contains the data file and is in proximity to the computing device.

The data backup module 800 includes an access pattern determination module 830 to determine an access pattern of the data files for the user. The data back policy module 805 can use the access patterns to create new data backup policies or update the exiting data backup policies in various ways for further optimizing the data backup and retrieval in the distributed backup system 100. For example, e.g., the data backup and retrieval can be optimized in terms of response time, storage space utilization across computing devices, or high availability of data files.

The access pattern can include data regarding (a) a particular computing device used by the user to access a particular data file, (b) a frequency of access of the particular data file from the particular computing device, (c) a set of computing devices that are in proximity to the particular computing device when the particular data file is accessed, (d) a period for which the particular computing device is used by the user to access the particular data file (e) a frequency of access of the particular data file, (f) a number of times the particular data file is obtained from the server, (g) a number of times the particular data file is obtained from any of the computing devices, etc.

Figure 9:
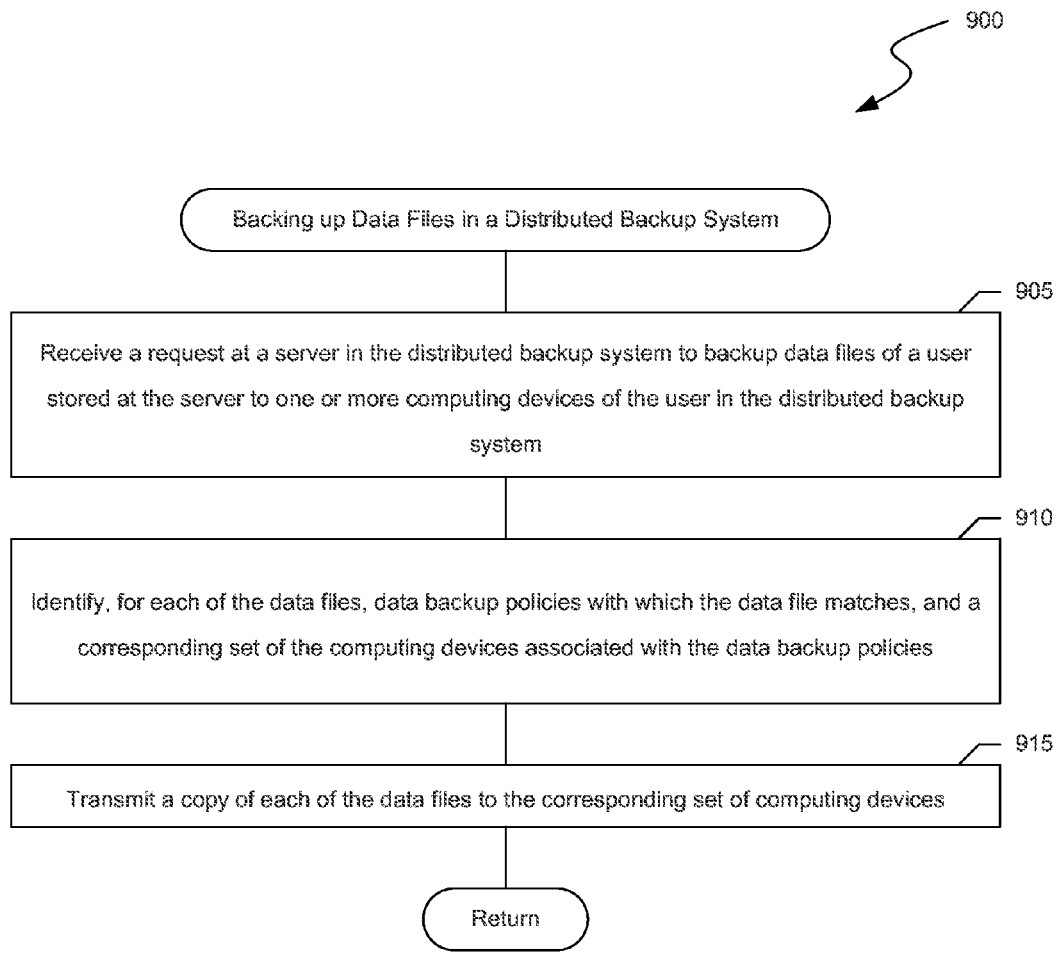
FIG. 9 is a flow diagram a process of backing up data files of a user from a server to multiple computing devices associated with the user.

FIG. 9 is a flow diagram a process 900 of backing up data files of a user from a server to multiple computing devices associated with the user. In some embodiments, the process 900 may be implemented in the distributed backup system 100 of FIG. 1, and using a data backup module 800 of FIG. 8. In some embodiments, data files of the user are stored across multiple computing devices of the user and/or a server in the distributed backup system 100. At block 905, the network component 605 of the server 110 receives a request to back up the data files of the user stored at the server to one or more computing devices of the user in the distributed backup system 100. In some embodiments the server 110 can be a cloud storage server. In some embodiments, the computing devices of the user are the devices using which the user typically accesses his data files. The computing devices can be mobile devices such as a smartphone, a tablet PC, a game console, a laptop etc.

At block 910, the policy identification module 810 identifies, for each of the data files stored at the server 110, one or more data backup policies with which the data file matches. After identifying the matching data backup policies, the policy identification module 810 also identifies the set of the computing devices associated with the matching data backup policies. For example, the policy identification module 810 can compare the data file attributes, e.g., type, format, or size, with each of the data backup policies 200 to determine whether the data file matches with a particular data backup policy. If data file matches with the particular data backup policy, the policy identification module 810 also identifies the computing device associated with the particular data backup policy as the computing device to which the data file is to be backed up. Consequently, the policy identification module 810 generates, for each of the computing devices, a dataset containing the data files that are to be transmitted to the corresponding computing device.

At block 915, the network component 605 transmits the datasets to the corresponding computing devices, and the process 900 returns.

Figure 10:
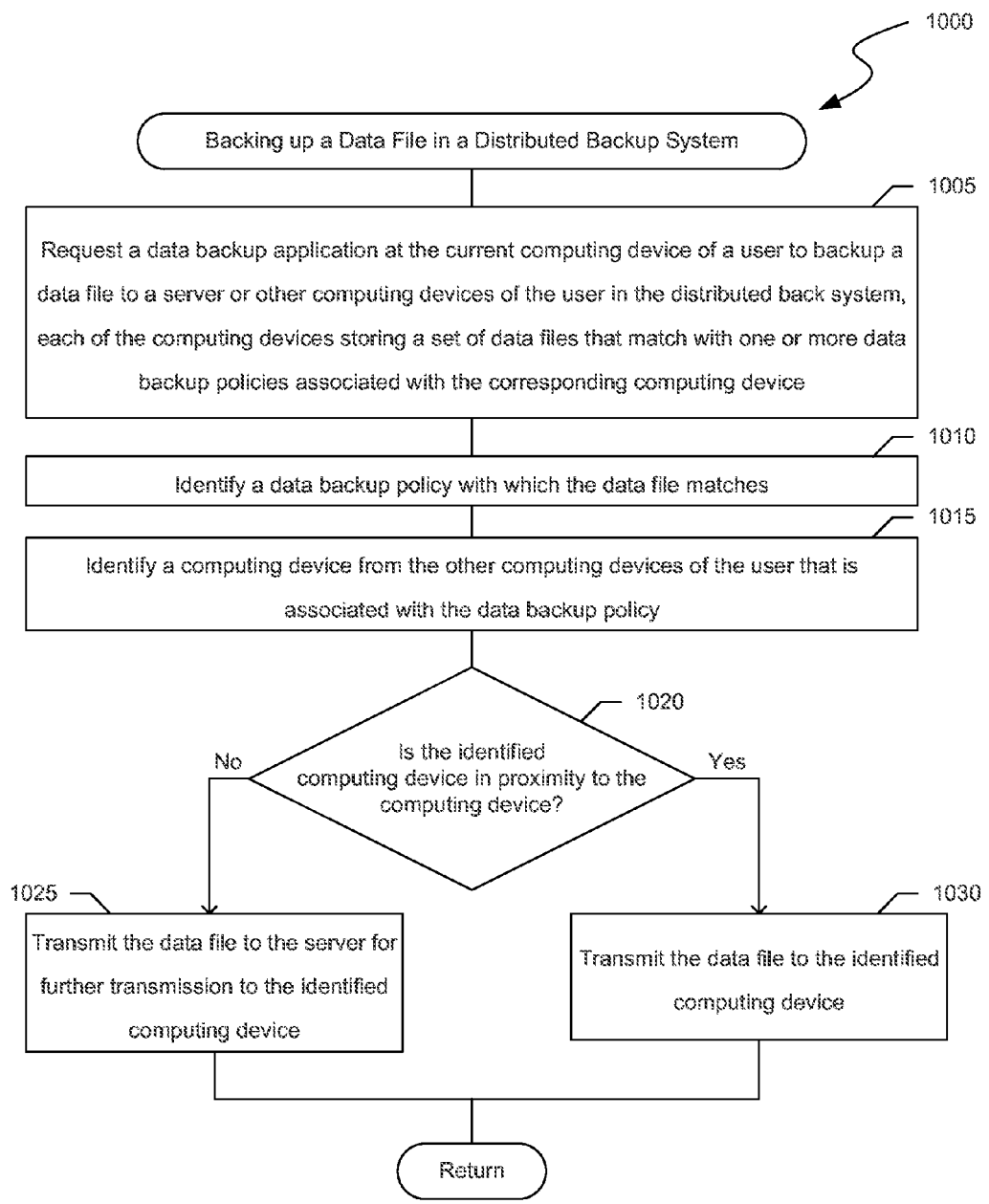
FIG. 10 is a flow diagram a process of backing up a data file of a user from a computing device of the user to other computing devices of the user in a distributed backup system.

FIG. 10 is a flow diagram a process 1000 of backing up a data file of a user from a computing device of the user to other computing devices of the user in a distributed backup system. In some embodiments, the process 1000 may be implemented in the distributed backup system 100 of FIG. 1, and using a data backup module 800 of FIG. 8. In some embodiments, data files of the user are stored across multiple computing devices of the user and/or a server in the distributed system 100. The computing devices are configured to store the data files based on data backup policies defined by the user and/or the distributed backup system 100. At block 1005, the network component 705 of the computing device 130 receives a request from the user to back up a data file at the computing device 130 to a server or other computing devices 140-150 of the user.

At block 1010, the policy identification module 810 at the computing device 130 identifies a data backup policy with which the data file matches. For example, the policy identification module 810 can compare the data file attributes, e.g., type, format, or size, with each of the data backup policies 200 to determine whether the data file matches with the data backup policy. If data file matches with the data backup policy, at block 1015, the policy identification module 810 identifies the computing device associated with the data backup policy for backing up the data file to.

At decision block 1020, the proxy determination module 820 at the computing device 130 determines if the computing device 130 and the identified computing device are in proximity to each other. The proxy determination module 820 determines that two computing devices are in proximity to one another if the two computing devices satisfy a proximity based criterion. In some embodiments, the two computing devices satisfy a proximity based criterion if the computing devices share a common communication network, e.g. a wireless network such as a home Wi-Fi network. In some embodiments, the two computing devices satisfy a proximity based criterion if geographical location proximity of the computing devices, e.g., a distance between the two computing devices or a function of the distance, is within a threshold. In some embodiments, the two computing devices satisfy a proximity based criterion if the computing devices can communicate directly, e.g., using direct communication techniques.

Responsive to a determination that the computing device 130 and the identified device are in proximity to each other, at block 1030, the network component 705 transmits the data file to the identified computing device. The identified computing device receives the data files and stores the data file at a storage device associated with the identified computing device.

On the other hand, responsive to a determination that the computing device 130 and the identified device are not in proximity to each other, at block 1025, the network component 705 transmits the data file to the server for further transmission of the data file to identified computing device. The server receives the data file from the computing device 130, and transmits it to the identified computing device.

Figure 11:
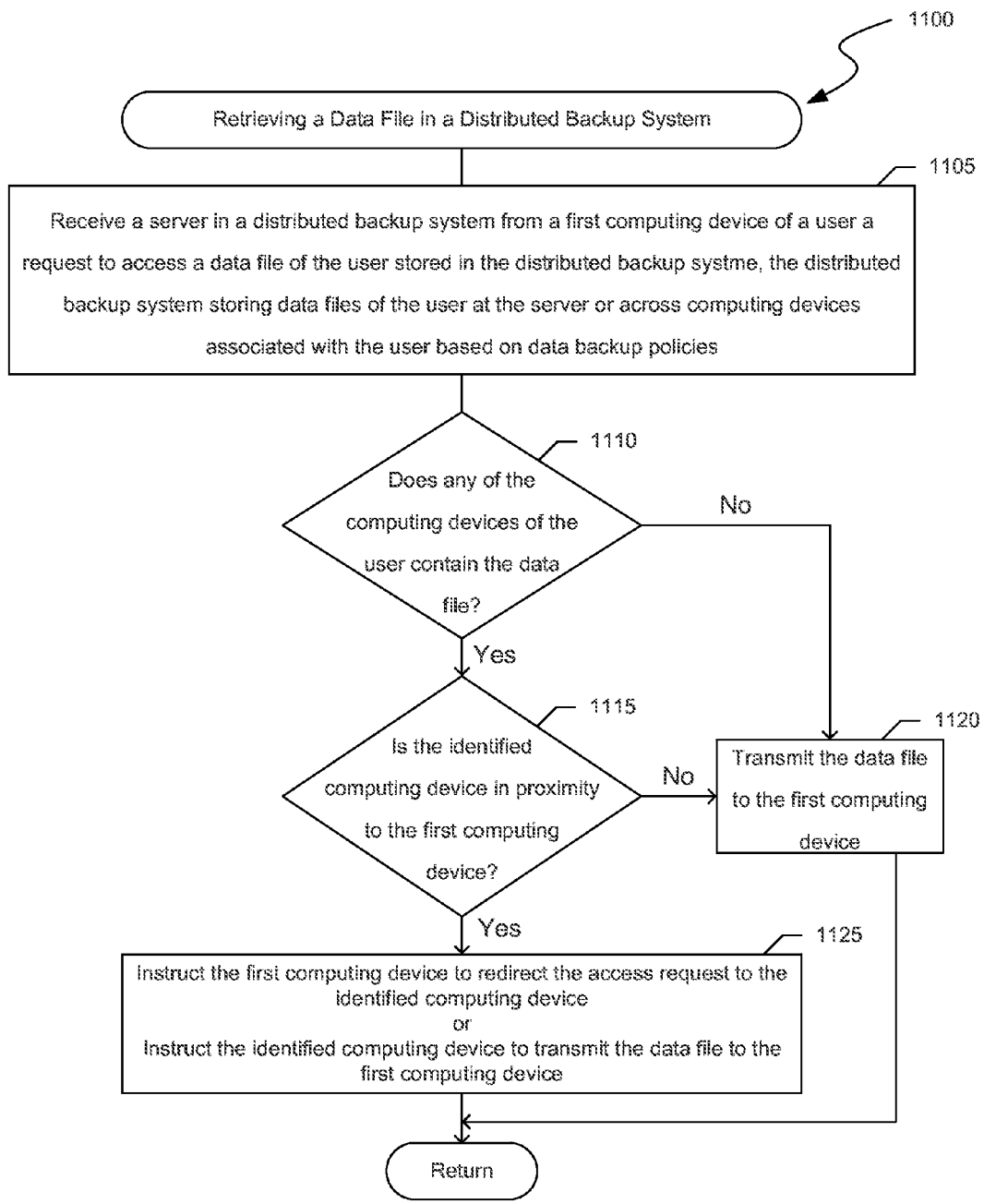
FIG. 11 is a flow diagram a process of retrieving a data file of a user from one or more computing devices of the user in a distributed backup system.

FIG. 11 is a flow diagram a process 1100 of retrieving a data file of a user from one or more computing devices of the user in a distributed backup system. In some embodiments, the process 1100 may be implemented in the distributed backup system 100 of FIG. 1, and using a data backup module 800 of FIG. 8. In some embodiments, data files of the user are stored across multiple computing devices of the user and/or a server in the distributed system 100. The computing devices are configured to store the data files based on data backup policies defined by the user and/or the distributed backup system 100. At block 1105, the network component 605 of the server 110 receives, from a first computing device of the user, a request to access a data file of the user stored in the distributed backup system 100. For example, the request can be a request to stream a video file to the first computing device.

At decision block 1110, the device identification module 815 determines if any of the remaining computing devices of the user contains the data file. In some embodiments, the device identification module 815 refers to a mapping stored in backup metadata, e.g., backup metadata 305, to obtain the location of the particular data file. In some embodiments, the device identification module 815 requests the policy identification module 810 to identify the computing devices containing the particular data file by identifying the data backup policy with which the particular data file matches.

Responsive to a determination that none of the remaining computing devices contain the data file, at block 1120, the network component 605 obtains the data file from the storage device associated with the server 110 and transmits the data file to the first computing device, and the process 1100 returns. For example, the server 110 streams the video file to the first computing device.

On the other hand, responsive to a determination that one of the remaining computing devices contain the data file, at decision block 1115, the proxy determination module 820 determines if the first computing device and the identified computing device are in proximity to each other. The proxy determination module 820 determines that two computing devices are in proximity to one another if the two computing devices satisfy a proximity based criterion. In some embodiments, the two computing devices satisfy a proximity based criterion if the computing devices share a common communication network, e.g. a wireless network such as a home Wi-Fi network. In some embodiments, the two computing devices satisfy a proximity based criterion if geographical location proximity of the computing devices, e.g., a distance between the two computing devices or a function of the distance, is within a threshold. In some embodiments, the two computing devices satisfy a proximity based criterion if the computing devices can communicate directly, e.g., using direct communication techniques.

Responsive to a determination that the first computing device and the identified device are not in proximity to each other, at block 1120, the network component 605 obtains the data file from the storage device associated with the server 110 and transmits the data file to the first computing device, and the process 1100 returns. For example, the server 110 streams the requested video file to the first computing device.

On the other hand, responsive to a determination that the first computing device and the identified computing device are in proximity to each other, at block 1125, the access redirection module 825 instructs the first computing device to redirect the access request to the identified computing device. In some embodiments, instead of instructing the first computing device to redirect its request to the identified computing device, the access redirection module 825 instructs the identified computing device to transmit the data file to the first computing device. Consequently, the first computing device obtains the data file from the identified computing device directly, e.g., using direct communication techniques. In some embodiments, the direct communication technique can include Wi-Fi communication via a wireless access point and P2P communication such as Bluetooth, Wi-Fi direct, AirDrop, Infrared, NFC, or DLNA. In transmitting the requested data file to the first computing device, the identified computing device acts as an edge cache of the distributed backup system for transmitting the requested data file. For example, the identified computing device acts as an edge cache for streaming the requested video file to the first computing device.

In some embodiments, edge caching refers to the use of caching servers to store content closer to end users. By having a computing device access the data file from a proximate computing device instead of from the server over the network, computing resources such as the response time in retrieving the data file is minimized.

Figure 12:
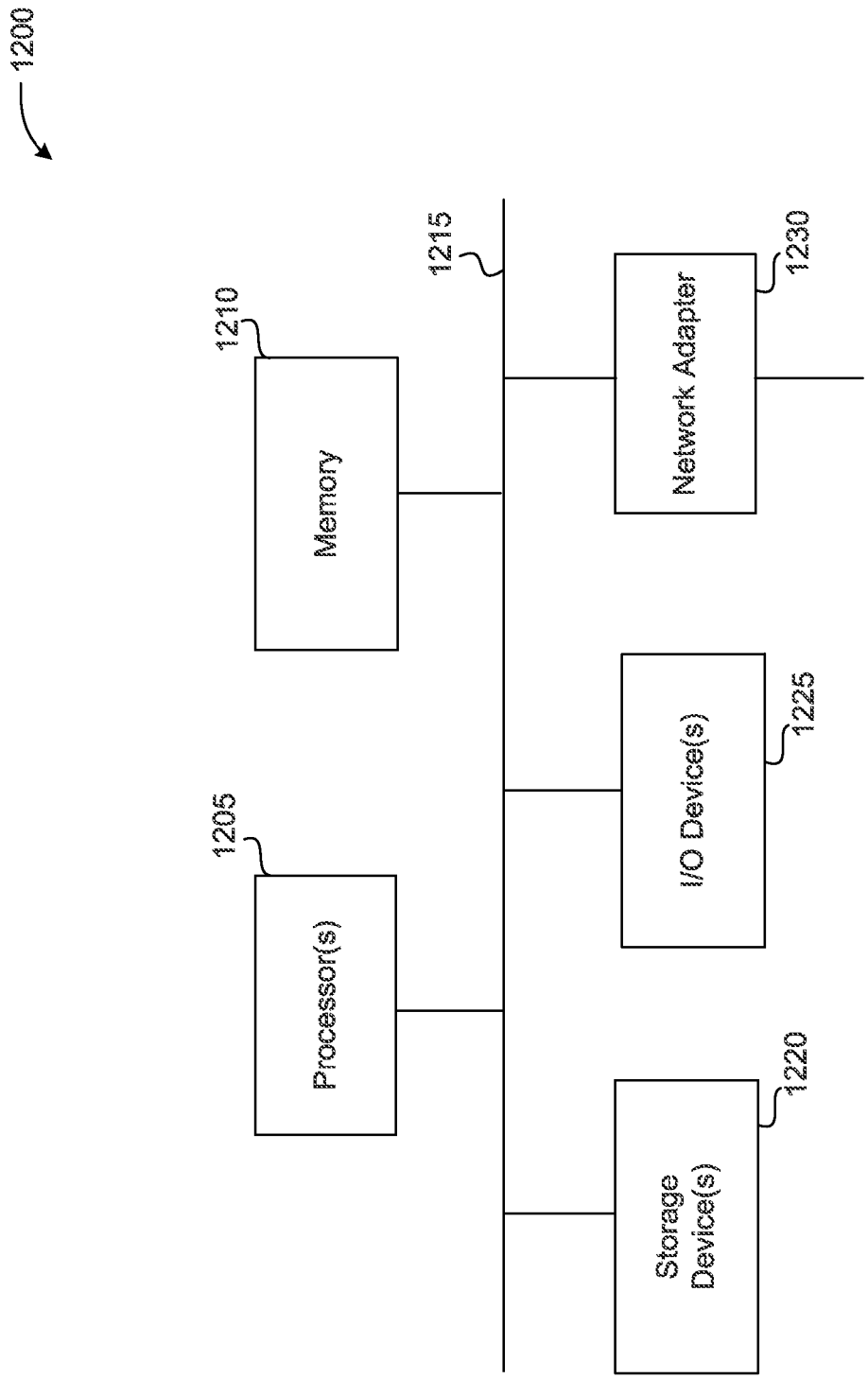
FIG. 12 is a block diagram of a computer system as may be used to implement features of some embodiments of the disclosed technology.

FIG. 12 is a block diagram of a computer system as may be used to implement features of some embodiments of the disclosed technology. The computing system 1200 may be used to implement any of the entities, components or services depicted in the examples of FIGS. 1-11 (and any other components described in this specification). The computing system 1200 may include one or more central processing units ("processors") 1205, memory 1210, input/output devices 1225 (e.g., keyboard and pointing devices, display devices), storage devices 1220 (e.g., disk drives), and network adapters 1230 (e.g., network interfaces) that are connected to an interconnect 1215. The interconnect 1215 is illustrated as an abstraction that represents any one or more separate physical buses, point to point connections, or both connected by appropriate bridges, adapters, or controllers. The interconnect 1215, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called "Firewire".

The memory 1210 and storage devices 1220 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1210 can be implemented as software and/or firmware to program the processor(s) 1205 to carry out actions described above. In some embodiments, such software or firmware may be initially provided to the computing system 1200 by downloading it from a remote system through the computing system 1200 (e.g., via network adapter 1230).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method of backing up a plurality of data files of a user across multiple computing devices associated with the user, the method comprising:
   receiving, at a data backup application executing on a specific computing device of the computing devices, a request to backup a plurality of audio files of the data files and a plurality of video files of the data files received at the specific computing device to a distributed backup system, the distributed backup system including the computing devices of the user and a cloud storage service configured to store at least a subset of the data files, the computing devices configured to store different subsets of the data files based on a plurality of data backup policies, wherein the audio files and the video files are backed up to distinct computing devices;
   identifying, by the data backup application, a first data backup policy of the data backup policies for backing up the audio files and a second data backup policy of the data backup policies for backing up the video files;
   identifying, by the data backup application, a first computing device of the computing devices that is associated with the first data backup policy and a second computing device of the computing devices that is associated with the second data backup policy;
   transmitting the audio files to the first computing device and the video files to the second computing device, the transmitting including:
      determining, by the data backup application, if the first computing device and the second computing device are in proximity to the specific computing device,
      responsive to a determination that the first computing device is in proximity to the specific computing device, transmitting, by the data backup application, the audio files to the first computing device via a short wireless range communication, and
      responsive to a determination that the second computing device is in proximity to the specific computing device, transmitting, by the data backup application, the video files to the second computing device via the short wireless range communication.

2. The computer-implemented method of claim 1 further comprising:
   responsive to a determination that the first computing device is not in proximity to the specific computing device, transmitting, by the data backup application, the audio files to the cloud storage service, and
   responsive to a determination that the second computing device is not in proximity to the specific computing device, transmitting, by the data backup application, the video files to the cloud storage service.

3. The computer-implemented method of claim 1 further comprising:
   transmitting, by the data backup application, the audio files and the video files to the cloud storage service.

4. The computer-implemented method of claim 1, wherein the first data backup policy identifies one of the computing devices as the first computing device to store the audio files based on an access pattern of a subset of the audio files by the user, and wherein the second data backup policy identifies one of the computing devices as the second computing device to store the video files based on an access pattern of at least a subset of the video files by the user.

5. The computer-implemented method of claim 1 further comprising:
   determining, by the data backup application, an access pattern of the audio files, the access pattern including data regarding at least one of (a) a particular computing device of the computing devices used by the user to access at least a subset of the audio files, (b) a frequency of access of the subset of the audio files from the particular computing device, or (c) a period for which the particular computing device is used by the user to access the subset of the audio files.

6. The computer-implemented method of claim 5 further comprising:
   updating, by the data backup application, the first data backup policy based on the access pattern of the subset of the audio files to identify the particular computing device as the first computing device to store the audio files.

7. The computer-implemented method of claim 1 further comprising:
   determining, by the data backup application, an access pattern of the audio files, the access pattern including data regarding at least one of (a) a frequency of access of a particular audio file of the audio files or (b) a number of times the particular audio file is retrieved from the cloud storage service to provide the user access to the particular audio file.

8. The computer-implemented method of claim 7 further comprising:
   determining, by the data backup application, whether to backup the particular audio file to the cloud storage service or to the first computing device based on the access pattern; and
   updating, by the data backup application, the first data backup policy for the particular audio file based on the determination.

9. The computer-implemented method of claim 1 further comprising:

determining, by the data backup application, an access pattern of the video files, the access pattern including data regarding at least one of (a) a particular computing device of the computing devices used by the user to access at least a subset of the video files, (b) a frequency of access of the subset of the video files from the particular computing device, or (c) a period for which the particular computing device is used by the user to access the subset of the video files.

10. The computer-implemented method of claim 9 further comprising:
updating, by the data backup application, the first data backup policy based on the access pattern of the subset of the video files to identify the particular computing device as the second computing device to store the video files.

11. The computer-implemented method of claim 1 further comprising:
determining, by the data backup application, an access pattern of the video files, the access pattern including data regarding at least one of (a) a frequency of access of a particular video file of the video files or (b) a number of times the particular video file is retrieved from the cloud storage service to provide the user access to the particular video file.

12. The computer-implemented method of claim 11 further comprising:
determining, by the data backup application, whether to backup the particular video file to the cloud storage service or to the second computing device based on the access pattern; and
updating, by the data backup application, the second data backup policy for the particular video file based on the determination.

13. The computer-implemented method of claim 1, wherein determining whether the first computing device and the second computing device are in proximity to the specific computing device includes determining whether the first computing device and the second computing device can communicate with the specific computing device over a short range wireless communication.

14. The computer-implemented method of claim 13, wherein the short range wireless communication includes communicating via common wireless network.

15. The computer-implemented method of claim 13, wherein the short range wireless communication includes a communication via at least one of (a) Bluetooth, (b) WiFi direct, (c) near field communication (NFC), (d) AirDrop, (e) Infrared, or (f) digital living network alliance (DLNA).

16. A server for backing up a plurality of data files of a user across multiple computing devices associated with the user, the server comprising:
a processor; and
a memory comprising instructions, which when executed by the processor, performs the method of:
receiving a request to backup a plurality of audio files of the data files and a plurality of video files of the data files, stored at the server, to the computing devices, the server including a plurality of data backup policies, each of the data backup policies identifying a subset of the data files to be stored at one or more of the computing devices, wherein the audio files and the video files are backed up to distinct computing devices,
identifying a first data backup policy of the data backup policies for backing up the audio files and a second data backup policy of the data backup policies for backing up the video files,
identifying a first computing device of the computing devices that is associated with the first data backup policy and a second computing device of the computing devices that is associated with the second data backup policy, the first data backup policy identifying one of the computing devices as the first computing device to store the audio files based on an access pattern of the audio files, the access pattern of the audio files determined as a function of an access of the audio files by the user and the one of the computing devices used to access the audio files, the second data backup policy identifying one of the computing devices as the second computing device to store the video files based on an access pattern of the video files, the access pattern of the video files determined as a function of an access of the video files by the user and the one of the computing devices used to access the video files, and
transmitting the audio files to the first computing device and the video files to the second computing device.

17. The server of claim 16, wherein the memory further comprises instructions, which when executed by the processor, performs the method of:
determining the access pattern of the audio files, the access pattern including data regarding at least one of (a) a particular computing device of the computing devices used by the user to access a subset of the audio files, (b) a frequency of access of the subset of the audio files from the particular computing device, or (c) a period for which the particular computing device is used by the user to access the subset of the audio files.

18. The server of claim 17, wherein the memory further comprises instructions, which when executed by the processor, performs the method of:
updating the first data backup policy based on the access pattern of the subset of the audio files to identify the particular computing device as the first computing device to store the audio files.

19. The server of claim 16, wherein the memory further comprises instructions, which when executed by the processor, performs the method of:
determining an access pattern of the audio files, the access pattern including data regarding at least one of (a) a frequency of access of a particular audio file of the audio files or (b) a number of times the particular audio file is retrieved from the server to provide the user access to the particular audio file.

20. The server of claim 19, wherein the memory further comprises instructions, which when executed by the processor, performs the method of:
determining whether to backup the particular audio file to the first computing device based on the access pattern; and
updating the first data backup policy for the particular audio file based on the determination.

21. The server of claim 16, wherein the memory further comprises instructions, which when executed by the processor, performs the method of:
determining the access pattern of the video files, the access pattern including data regarding at least one of (a) a particular computing device of the computing devices used by the user to access a subset of the video files, (b) a frequency of access of the subset of the video files from the particular computing device, or (c) a period for which the particular computing device is used by the user to access the subset of the video files.

22. The server of claim 21, wherein the memory further comprises instructions, which when executed by the processor, performs the method of:
updating the second data backup policy based on the access pattern of the subset of the video files to identify the particular computing device as the second computing device to store the video files.

23. The server of claim 16, wherein the memory further comprises instructions, which when executed by the processor, performs the method of:
determining an access pattern of the video files, the access pattern including data regarding at least one of (a) a frequency of access of a particular video file of the video files or (b) a number of times the particular video file is retrieved from the server to provide the user access to the particular video file.

24. The server of claim 23, wherein the memory further comprises instructions, which when executed by the processor, performs the method of:
determining whether to backup the particular video file to the second computing device based on the access pattern; and
updating the second data backup policy for the particular video file based on the determination.

25. A computer-readable storage medium comprising instructions, which when executed by a processor, performs the method of:
receiving, at a specific computing device of a plurality of computing devices associated with a user, a request to backup a plurality of audio files and a plurality of video files to a distributed backup system, the audio files and the video files being part of a plurality of data files of the user, the distributed backup system including the computing devices of the user and a cloud storage service configured to store at least a subset of the data files, the computing devices configured to store different subsets of the data files based on a plurality of data backup policies, wherein the audio files and the video files are backed up to distinct computing devices;
identifying, by the data backup application, a first data backup policy of the data backup policies for backing up the audio files and a second data backup policy of the data backup policies for backing up the video files;
identifying, by the data backup application, a first computing device of the computing devices that is associated with the first data backup policy and a second computing device of the computing devices that is associated with the second data backup policy;
transmitting the audio files to the first computing device and the video files to the second computing device, the transmitting including:
determining, by the data backup application, if the first computing device and the second computing device are in proximity to the specific computing device,
responsive to a determination that the first computing device is in proximity to the specific computing device, transmitting, by the data backup application, the audio files to the first computing device via a short wireless range communication, and
responsive to a determination that the second computing device is in proximity to the specific computing device, transmitting, by the data backup application, the video files to the second computing device via the short wireless range communication.

26. The computer-readable storage medium of claim 25 further comprising instructions, which when executed by the processor, performs the method of:
responsive to a determination that the first computing device is not in proximity to the specific computing device, transmitting, by the data backup application, the audio files to the cloud storage service, and
responsive to a determination that the second computing device is not in proximity to the specific computing device, transmitting, by the data backup application, the video files to the cloud storage service.

27. The computer-readable storage medium of claim 25 further comprising instructions, which when executed by the processor, performs the method of:
transmitting, by the data backup application, the audio files and the video files to the cloud storage service.

28. The computer-readable storage medium of claim 25, wherein the instructions for determining whether the first computing device and the second computing device are in proximity to the specific computing device includes instructions for determining whether the first computing device and the second computing device can communicate with the specific computing device over a short range wireless communication.

29. The computer-readable storage medium of claim 25, wherein the short range wireless communication includes communicating via common wireless network.

30. The computer-readable storage medium of claim 25, wherein the short range wireless communication includes a communication via at least one of (a) Bluetooth, (b) WiFi direct, (c) NFC, (d) AirDrop, (e) Infrared, or (f) DLNA.

* * * * *